T867024

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 28, 1969

867 O.G. 1093

836,212

SYNTHETIC FILAMENTS

Geoffrey Hugh Jones, Abergavenny, England, assignor to British Nylon Spinners Limited, Pontypool, Monmouthshire, England

Continuation of abandoned application Ser. No. 435,095, Feb. 24, 1965. This application June 12, 1969. Published Oct. 28, 1969

Int. Cl. D02g *3/22*

U.S. Cl. 161—177

1 Sheet Drawing. 5 Pages Specification

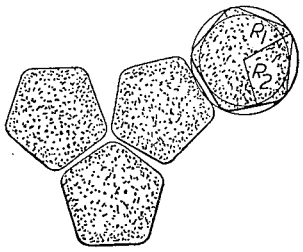

Textile filaments comprising at least one synthetic high molecular weight polymer having a cross-sectional shape in the form of a regular pentagon with rounded apices, the sides of the pentagon being substantially straight and substantially equal to each other, and wherein the angles between said sides are substantially equal to each other and average 108 degrees.

T867024
Oct. 28, 1969
G. H. JONES
836212
DEF. PUB.
SYNTHETIC FILAMENTS
Original Filed Feb. 24, 1965
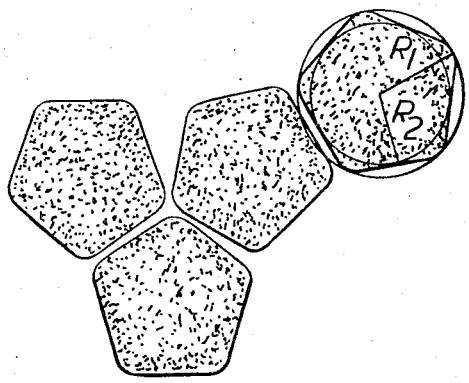
Inventor
GEOFFREY HUGH JONES
By
D. J. De Witt & Harold S. Grim Attorneys